(12) United States Patent
Cornic et al.

(10) Patent No.: US 7,940,205 B2
(45) Date of Patent: May 10, 2011

(54) METHOD USING RADAR TO DETECT A KNOWN TARGET LIKELY TO BE POSITIONED AT APPROXIMATELY A GIVEN HEIGHT, NEAR OTHER TARGETS POSITIONED AT APPROXIMATELY THE SAME HEIGHT

(75) Inventors: Pascal Cornic, Brest (FR); Eric Barraux, Brest (FR); Patrick Garrec, Merignac (FR)

(73) Assignee: Thales (FR)

( * ) Notice: Subject to any disclaimer, the term of this patent is extended or adjusted under 35 U.S.C. 154(b) by 84 days.

(21) Appl. No.: 12/409,717

(22) Filed: Mar. 24, 2009

(65) Prior Publication Data
US 2009/0284406 A1  Nov. 19, 2009

(30) Foreign Application Priority Data

Apr. 1, 2008  (FR) ...................... 08 01787

(51) Int. Cl.
*G01S 13/00* (2006.01)
*G01S 13/08* (2006.01)
(52) U.S. Cl. ............... 342/29; 342/36; 342/95; 342/118; 342/140
(58) Field of Classification Search ............... 342/29–51, 342/118, 140, 147, 158, 175
See application file for complete search history.

(56) References Cited

U.S. PATENT DOCUMENTS

| | | | | |
|---|---|---|---|---|
| 2,924,819 A | * | 2/1960 | Cutler | 342/34 |
| 3,758,765 A | * | 9/1973 | Vietor | 701/18 |
| 4,050,069 A | * | 9/1977 | Schlussler | 342/33 |
| 4,316,191 A | * | 2/1982 | Sawatari et al. | 342/91 |
| 4,635,064 A | * | 1/1987 | Chisholm | 342/408 |
| 4,910,526 A | * | 3/1990 | Donnangelo et al. | 342/455 |
| 4,918,610 A | * | 4/1990 | Becker | 701/218 |
| 4,990,921 A | * | 2/1991 | Chisholm | 342/35 |
| 5,115,244 A | * | 5/1992 | Freedman et al. | 342/158 |

(Continued)

FOREIGN PATENT DOCUMENTS

EP  0947852 A1 *  6/1999

(Continued)

OTHER PUBLICATIONS

Eckersten C, etal. "Radar tracking of sea-skimmers, an implementation of complex angle" Radar 92. International Confrerence Brighton, UK, Jan. 1, 1992, pp. 46-49.

*Primary Examiner* — Thomas H Tarcza
*Assistant Examiner* — Peter Bythrow
(74) *Attorney, Agent, or Firm* — Stroock & Stroock & Lavan LLP

(57) ABSTRACT

Using a radar to detect a known target likely to be positioned at approximately a predetermined height close to other targets, these other targets also being positioned at approximately the predetermined height. A first phase of detecting the known target is carried out by performing an azimuth scan. When the known target has been detected at a certain distance Di at a certain azimuth angle θaz, a second detection phase is carried out at said azimuth angle θaz and at an elevation angle θEL corresponding to that of an object situated at said distance Di at the predetermined height. The target is said to be detected if it is detected at the elevation angle θEL at a distance D approximately equal to the distance Di.

8 Claims, 2 Drawing Sheets

U.S. PATENT DOCUMENTS

| | | | | |
|---|---|---|---|---|
| 5,128,683 | A | * | 7/1992 | Freedman et al. ............ 342/158 |
| 5,173,706 | A | * | 12/1992 | Urkowitz ........................ 342/99 |
| 5,359,334 | A | * | 10/1994 | Gutman ......................... 342/408 |
| 5,838,276 | A | * | 11/1998 | Chapman et al. ............... 342/35 |
| 5,907,568 | A | * | 5/1999 | Reitan, Jr. .................. 342/26 B |
| 6,311,108 | B1 | * | 10/2001 | Ammar et al. ................. 701/16 |
| 6,809,679 | B2 | * | 10/2004 | LaFrey et al. ................... 342/37 |
| 6,983,206 | B2 | * | 1/2006 | Conner et al. ................ 701/301 |
| 7,301,497 | B2 | * | 11/2007 | Roddy et al. .................. 342/176 |
| 2009/0055038 | A1 | * | 2/2009 | Garrec et al. ................... 701/17 |

FOREIGN PATENT DOCUMENTS

| | | |
|---|---|---|
| EP | 0947852 A | 10/1999 |
| FR | 2878336 A | 5/2006 |
| FR | 2894347 A | 6/2007 |
| FR | 2901613 A | 11/2007 |

* cited by examiner

METHOD USING RADAR TO DETECT A KNOWN TARGET LIKELY TO BE POSITIONED AT APPROXIMATELY A GIVEN HEIGHT, NEAR OTHER TARGETS POSITIONED AT APPROXIMATELY THE SAME HEIGHT

The present application claims the benefit of French Patent Application No. 0801787, filed on Apr. 1, 2008, which is hereby incorporated by reference in its entirety.

The present invention relates to a method using a radar to detect a known target likely to be positioned at approximately a given height close to other targets, these also being positioned at approximately the same height. It applies, for example, in the field of systems for assisting the take-off and landing of aircraft. In this case the known target is an aircraft on a landing runway and the other targets may be other aircraft on the ground, buildings, or fixed or movable equipment located at the edge of the runway.

Ground systems make it possible to assist aircraft in taking off and landing. Optionally, they may even make it possible for them to take off or land completely automatically, the system taking charge of all the operations from the ground. At take-off, it is necessary to detect and locate precisely the stationary aircraft on the landing runway, in order then to be able to track it until it actually leaves the runway. However, detecting a stationary aircraft on the ground and determining its position precisely do not come without posing numerous difficulties. Notably, as the aircraft is not moving, a conventional radar cannot exploit Doppler shift to discriminate, in one and the same distance resolution cell, between echoes coming from the aircraft and interference echoes coming from other targets likely to be located nearby. This is one of the technical problems the present invention proposes to solve.

Current solutions use a radar with a pencil beam in millimetric waves, providing very high resolution with respect to distance. However, such a radar is expensive and the size of the antenna necessary in order to isolate a target of interest in the beam may be prohibitive. In addition, interference echoes may limit detection when the signal/noise ratio is too low. Furthermore, radars, whether millimetric or otherwise, are sensitive to reflections, in particular on the ground. The reflections may generate a fringe trough that prevents detection and location. Other systems use a laser beam. However, the pointing abilities of a laser beam are very strongly disturbed in times of fog. In both cases, radar with a millimetric wave beam or a laser beam, expensive scanning means for the beam are necessary, along with expensive means for pointing the beam extremely accurately relative to the runway. Other current solutions use a positioning system by satellite triangulation of the Global Positioning System (GPS) or Differential Global Positioning System (DGPS) type. However, these positioning systems can be easily interfered with by ground reflections, notably for the measurement of altitude, and can easily be jammed. Other current solutions make use of a transponder on board the aircraft. However, a precise measurement of distance then requires expensive electronics.

The present patent application follows on from other applications filed by the applicant for inventions connected with the present invention. On the one hand, this involves the application published in France under the number FR 2 878 336 A1, which relates to a method and a device for locating an aircraft, notably in order to guide it automatically in the landing phase. This application teaches essentially how to use a low-cost radar, an on board emitter beacon and an emitter beacon on the ground, to locate an aircraft in the approach phase approaching a landing runway. On the other hand, it involves the application filed in France in 2007 under the number 0 701 926, which relates to an array antenna for location at low elevation. This application essentially teaches how to measure by interferometer, using ground reflections, the azimuth and elevation angles of a beacon emitting a continuous signal (CW) on board an aircraft in the approach phase approaching a landing runway. In the rest of the application, the term "elevation" will be used to denote the angle of elevation.

The aim of the present invention is notably to solve the aforementioned problems of current solutions in order to detect and locate precisely a stationary aircraft at the end of the runway before taking off. To do this, the present invention proposes to exploit the fact that, in a device according to the application FR 2 878 336 A1, when the aircraft is at the end of the runway ready for take-off, the relative position in relation to the radar of the beacon on board the aircraft is known a priori, as is its frequency of emission. Notably, the elevation of the beacon in relation to the radar is known a priori and it is unlikely that this elevation will be the same as other sources emitting at the same frequency situated at the same azimuth in relation to the radar. The present invention thus proposes to exploit this a priori known elevation to discriminate, in one and the same distance resolution cell, the aircraft carrying the beacon from interference emissions, this being done by measuring the azimuth and elevation in accordance with the French application with the filing number 0 701 926. To this end, the subject of the invention is a method using a radar to detect a known target likely to be positioned at approximately a given height H2 close to other targets, these also being positioned at approximately the height H2. A first phase of detecting the known target is carried out by performing an azimuth scan. When the known target has been detected at a certain distance Di at a certain azimuth angle θaz, a second detection phase is carried out at said azimuth angle θaz and at an elevation angle θEL corresponding to that of an object situated at said distance Di at the height H2. The target is then said to be detected if it is detected at the elevation angle θEL at a distance D approximately equal to the distance Di. The second detection phase therefore confirms or invalidates the detection of the known target at the azimuth angle θaz.

Advantageously, the detection phases may include interferometric processing or Doppler processing.

For example, the known target may be a beacon emitting a signal. The beacon may be carried at the height H2 by an aircraft situated approximately on the longitudinal axis A of a landing runway. The radar may comprise a receiver antenna capable of detecting the signal emitted by the beacon. The antenna may be positioned at a given lateral distance Dlat in relation to the axis A. When the beacon has been detected at the distance Di at the azimuth angle θaz, the second detection phase may be carried out at said azimuth angle θaz and at an elevation angle θEL corresponding to that of an object situated on the axis A at the height H2.

For example, the beacon may emit a continuous signal at a given frequency.

In a preferred embodiment, a reference emitter beacon emitting a signal at a different frequency from the signal emitted by the beacon (2) carried by the aircraft may make it possible to calibrate the receiver antenna.

Advantageously, the reference emitter beacon may be positioned at the height H2, at the lateral distance Dlat in relation to the axis A, approximately aligned with a position at which the aircraft carrying the beacon is likely to be situated.

The subject of the present invention is also a method using a radar to locate a beacon emitting a signal. The beacon is carried at a given height H2 by an aircraft situated approximately on the longitudinal axis A of a landing runway, near targets themselves also positioned at approximately the height H2. The radar comprises a receiver antenna capable of detecting the signal emitted by the beacon. The antenna is positioned at a given lateral distance Dlat in relation to the axis A. A first phase of detecting the beacon is carried out by performing an azimuth scan. When the beacon has been detected at a certain distance Di at a certain azimuth angle θaz, a second detection phase is carried out at said azimuth angle θaz and at an elevation angle θEL corresponding to that of an object situated on the axis A at the height H2. When the beacon has been detected at a certain distance D at the elevation angle θEL, the position of the beacon (2) is said to be defined by the azimuth angle θaz and the distance D if the distance D is approximately equal to the distance Di.

Further main advantages of the invention are that it can be implemented on the basis of a low-cost device, such as that described in the two aforementioned applications for example. This is because a radar with a passive antenna and a fixed broad beam suffices, with no mechanical servocontrol device for the antenna being necessary. Such antennas have excellent failure tolerance, which can also reduce maintenance costs. The antenna may furthermore exploit a simple continuous signal emitted by a low-cost beacon carried by the aircraft.

Further features and advantages of the invention will become apparent with the help of the following description, with regard to the appended drawings in which.

Figure 1:
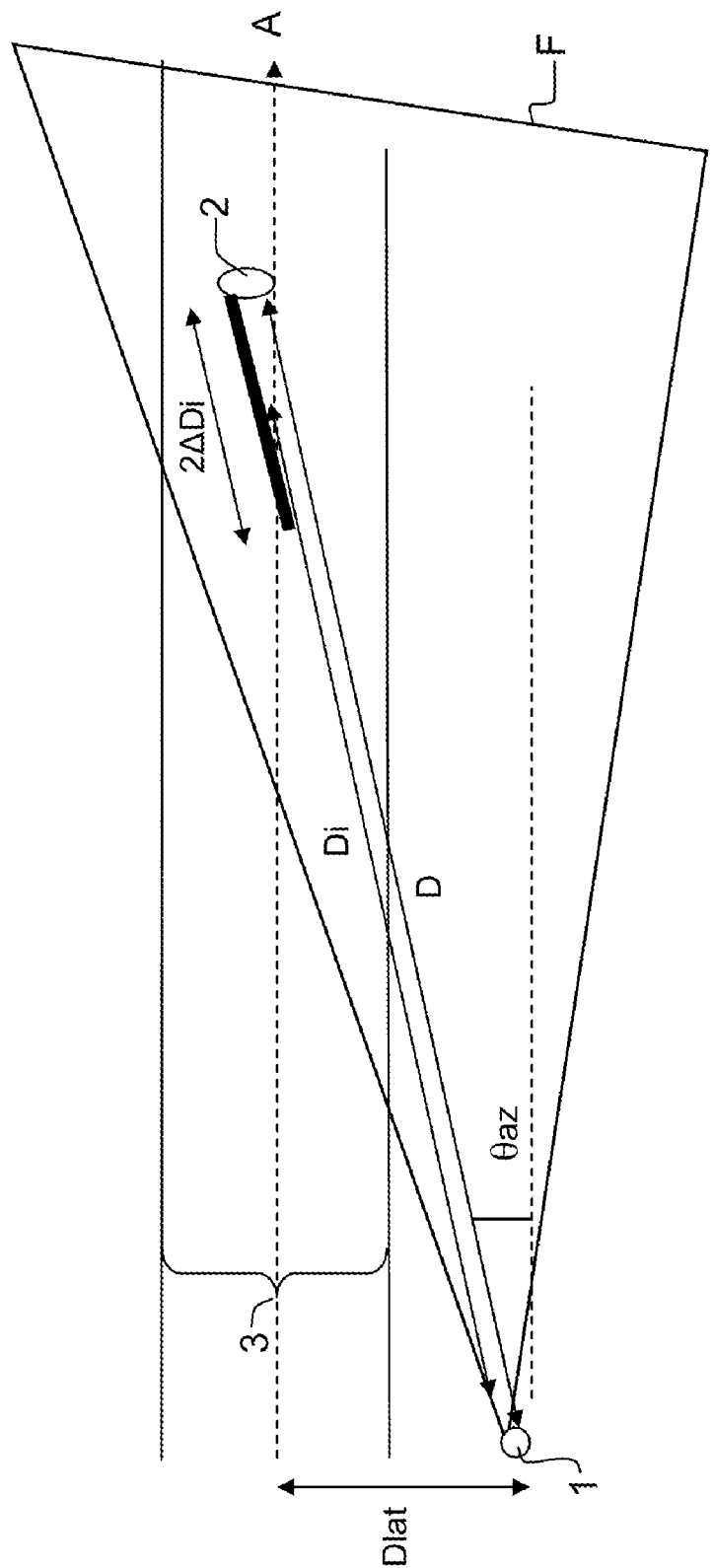
FIG. 1 shows, through a view from above, an exemplary implementation of the present invention.

FIG. 1 illustrates an exemplary implementation of the present invention through a view from above. A radar 1 comprises an array antenna with a fixed wide beam. In the present exemplary embodiment, the radar 1 is similar to the radar described in the two previously cited applications. It is therefore capable of precisely measuring the azimuth and the elevation of a target at ground level. The radar 1 is located at the edge of a landing runway 3 with a given lateral separation Dlat in relation to the axis A of the runway 3. For example, a beacon 2 emitting a signal CW at a known frequency may be on board an aircraft (not shown in FIG. 1), the aircraft being stationary at the end of the runway 3, ready to take off. Advantageously, in this embodiment, the radar 1 is capable of precisely measuring an azimuth angle θaz of the radar 1 to the beacon 2 by interferometry. In this situation of waiting at the point of take-off, the aircraft carrying the beacon 2 and therefore the beacon 2 itself are approximately on the axis A. In relation to the radar 1, the beacon 2 is situated at a distance D from the ground at the azimuth θaz. The radar-beacon axis, directed along the azimuth θaz, intersects the axis A at a distance Di from the radar 1. The distance Di is given by θaz=Dlat/Di. As Dlat is known, the distance Di can be deduced with an uncertainty +/−ΔDi linked with an error Δθaz in the azimuth measurement. It can be deduced that the point of intersection between the radar-beacon axis and the axis A is located in an area of uncertainty of length 2ΔDi as illustrated by FIG. 1.

The radar 1, in the same way as any radar with performance similar to that of the radar described in the two aforementioned applications, is capable of measuring the azimuth θaz precisely. Indeed, with such a radar, the error Δθaz is of the order of only ±1 milliradian. Thus the position of the point of intersection between the radar-beacon axis and the axis A can also be calculated with great precision. For example, if the distance D from the radar 1 to the beacon 2 is around 600 meters, then for a lateral separation Dlat of 50 meters, the angle θaz measured by the radar 1 is 83 milliradians. As a result, the distance Di calculated is 602 meters. A measurement error of +/−1 milliradian in the angle θaz in this case leads to an error of +/−7 meters in Di. The area of uncertainty is therefore no less than 14 meters in length! It appears necessary to use an additional criterion to confirm that the beacon 2 is located approximately on the axis A.

Figure 2:
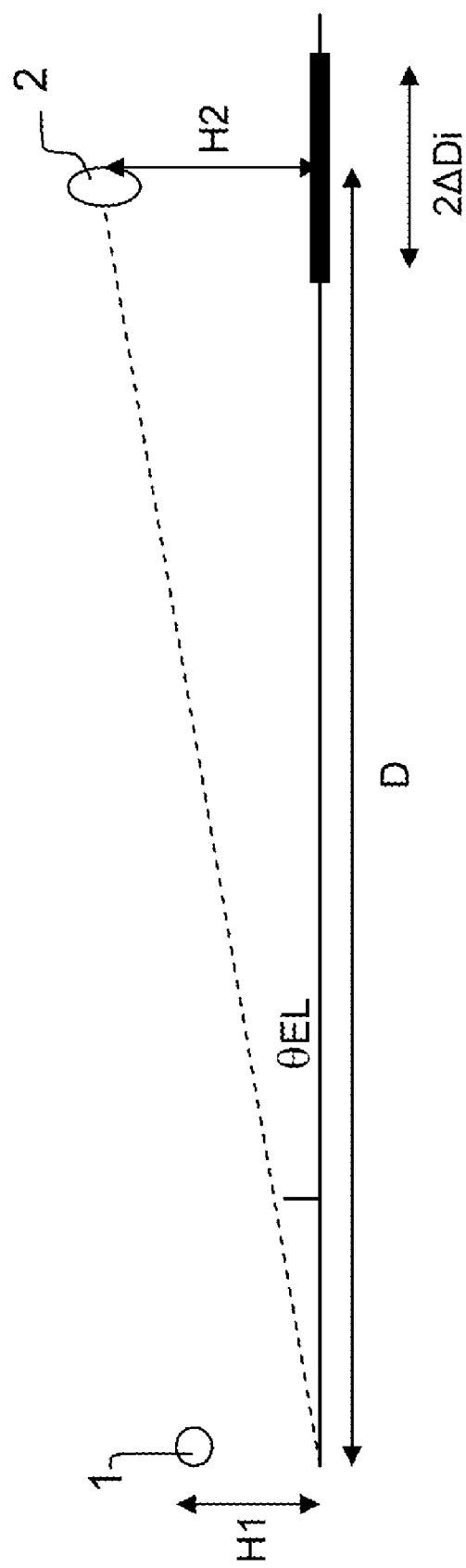
FIG. 2 shows, through a side view, the same exemplary implementation of the present invention.

FIG. 2 illustrates, through a side view, the same exemplary implementation of the present invention as FIG. 1. It is assumed that the beacon 2 is situated at the point of intersection between the radar-beacon axis and the axis A, i.e. at the distance Di of 602 m from the radar 1 and on the azimuth of 83 milliradians as previously calculated. The radar 1, in the same way as any radar with performance similar to that of the radar described in the two aforementioned applications, is capable, despite the fact that the beacon is at ground level, of measuring precisely an angle of elevation θEL of the beacon 2 in relation to the foot of the radar 1. To do this, the radar 1 uses interferometry to exploit the ground reflections of the signal CW emitted by the beacon 2. As the beacon 2 is located on the aircraft at an installation height H2 relative to the ground, with H2 being known and being around one meter, and as the radar 1 is located at an installation height H1 relative to the ground, with H1 being known and also being around one meter, and as the distance D between the radar 1 and the point of take-off is around 600 m, the elevation angle θEL is around only 1 milliradian. Advantageously, by measuring the frequency of amplitude modulation on the antenna of the radar 1, the interferometric method described in the previously cited French application with the patent number 0 701 926 makes it possible to measure such a small value of θEL with sufficient precision. As the height H2 is known, it is then simple to deduce the distance D from the radar 1 to the beacon 2. The distance D is given by the equation θEL=H2/D, with an uncertainty of +/−ΔD linked with a measurement error ΔθEL in the elevation. The beacon 2 is therefore located in an area of uncertainty of longitudinal length 2ΔD on the runway, as illustrated in FIG. 2.

If the distance D calculated from the measurement of elevation θEL is approximately equal to the distance Di calculated from the measurement of the azimuth θaz, i.e. if D and Di are equal, to within the uncertainty in measurement, or if D is between Di−ΔDi−ΔD and Di+ΔDi+ΔD, then the beacon is said to be detected at the position defined starting from the radar 1 by the azimuth θaz and the distance D.

If the calculated distance D is not between Di−ΔDi−ΔD and Di+ΔDi+ΔD, then the beacon 2 is not said to be detected.

The measurement of the elevation θEL therefore provides an additional criterion making it possible to confirm or invalidate that it is in fact the beacon 2 that has been detected at the azimuth θaz. In fact the measurement of the elevation θEL makes it possible to discriminate the targets that are situated at the height H2 relative to the ground from targets that are not. This is because the elevation θEL of the beacon 2 in relation to the radar 1 is known a priori and it is unlikely that this elevation will be the same as those of other targets situated nearby and at the same azimuth θaz. In view of the precision of the measurement of the elevation θEL by the radar 1, it is extremely unlikely that a beacon other than beacon 2 would be able to successfully pass the confirmation test, unless another aircraft is literally stuck to the aircraft carrying the beacon 2, which in practice is virtually impossible in a take-off area. Moreover, this situation is strictly impossible if two different aircraft are carrying beacons emitting at different frequencies and/or with different codes, which is the case in the device according to the application FR 2 878 336 A1.

It is necessary to understand that the use of the radar 1 that is identical to the radar described in the two previously cited applications is only proposed by way of example. In fact, any other radar capable of precisely measuring the azimuth and elevation of a target at ground level may also be used to implement the present invention. As for the value of the installation height H2 of the beacon 2, this is a function of the type of aircraft carrying the beacon 2. The device of FIGS. 1 and 2 should therefore be parameterized depending on the type of aircraft, which causes variation in the installation height H2.

In a preferred embodiment, a reference emitter beacon, similar to the beacon 2 but emitting at a different frequency, may be positioned at the edge of the runway 3. Ideally, this reference beacon may be positioned at the edge of the runway 3 aligned with the theoretical point of take-off. Being situated at the distance Dlat from the axis A, it can improve the precision of measurement of the azimuth θaz. Being situated at the height H2, it can improve the precision of measurement of the elevation θEL. The reference beacon therefore constitutes an excellent self-calibration device at very low cost. This is because any bias in the measurement of the position of the beacon 2 is cancelled out by the bias in the measurement of the position of the reference beacon. The device of FIGS. 1 and 2 therefore becomes insensitive to variations in temperature, for example.

In another embodiment, the radar 1 is able to advantageously exploit the Doppler shift. It is then capable of detecting by skin echo the aircraft carrying the beacon 2 when it is taxiing on the runway 3. However, as long as the aircraft carrying the beacon 2 is stationary, Doppler processing is ineffective and therefore incapable of discriminating between fixed targets as soon as they are seen in the same distance resolution cell corresponding approximately to the distance D. However, advantageously, if the aircraft comprises a propeller, Doppler processing makes it possible to discriminate said aircraft when ready for take-off from other aircraft parked nearby and whose possible propellers are stationary.

One of the main advantages of the invention described above is also that it does not require particular precautions relating to the positioning of the radar in relation to the runway. By using an interferometric method, the invention described above is also insensitive to the angular positioning of the antenna of the radar, the angular positioning of the antenna being able to vary with gusts of wind. Furthermore, by virtue of the simplicity of the equipment that it requires, the invention offers a high level of reliability, both in terms of the radar and in terms of the beacon. And in the exceptional case where the beacon breaks down, the use of an active antenna radar may even provide a redundancy function.

The invention claimed is:

1. A method of using a radar to detect a known target likely to be positioned at approximately a predetermined height, close to other targets positioned at approximately the predetermined height, the method comprising the steps of:

scanning in azimuth to detect a first unknown target, to produce a first distance measurement corresponding to a distance to the detected first unknown target, and to produce an azimuth angle θaz as an azimuth angle to the detected unknown target, the step of scanning in azimuth forming a first phase of detection;

calculating an elevation angle θEL corresponding to an object situated at said first distance and at the predetermined height;

searching at the elevation angle θEL and at the azimuth angle θaz for a second unknown target at a second distance, the step of searching at the elevation angle θEL and at the azimuth angle θaz forming a second phase of detection; and comparing the second distance to the first distance measurement, to detect the known target if the second distance is approximately equal to the first distance measurement.

2. The method as claimed in claim 1, wherein the first and second phases of detection comprise interferometric processing.

3. The method as claimed in claim 1, wherein the first and second phases of detection comprise Doppler processing.

4. The method as claimed in claim 1, wherein:

the known target comprises a beacon emitting a signal, the beacon being carried at the predetermined height by an aircraft situated approximately on a longitudinal axis of a landing runway; and the radar comprises a receiver antenna capable of detecting the signal emitted by the beacon, the receiver antenna being positioned at a predetermined lateral distance perpendicular to the longitudinal axis, wherein, when the beacon has been detected at the first distance at the azimuth angle θaz, the second phase of detection is carried out at said azimuth angle θaz and at an elevation angle θEL corresponding to that of an object situated on the longitudinal axis at the predetermined height.

5. The method as claimed in claim 4, wherein the beacon emits a continuous signal at a predetermined frequency.

6. The method as claimed in claim 5, further comprising the step of:

emitting, by a reference emitter beacon, a signal at a different frequency from the signal emitted by the beacon carried by the aircraft, in order to calibrate the receiver antenna.

7. The method as claimed in claim 6, wherein the reference emitter beacon is positioned:

at the predetermined height;

at the lateral distance perpendicular to the longitudinal axis; and approximately aligned with a position at which the aircraft carrying the beacon is likely to be situated.

8. A method of using a radar to locate a beacon emitting a signal, the beacon being carried at a predetermined height by an aircraft situated approximately on a longitudinal axis of a landing runway, near targets that are also positioned at approximately the predetermined height, the radar comprising a receiver antenna capable of detecting the signal emitted by the beacon, the receiver antenna being positioned at a predetermined lateral distance perpendicular to the longitudinal axis, the method comprising:

scanning in azimuth to detect a first detected beacon, to produce a first distance measurement corresponding to a distance to the first detected beacon, and to produce an azimuth angle θaz as an azimuth angle to the first detected beacon, the step of scanning in azimuth forming a first phase of detection;

calculating an elevation angle θEL corresponding to the elevation angle of an object situated at the azimuth angle θaz on the longitudinal axis at the predetermined height;

searching at the azimuth angle θaz and at the elevation angle θEL to detect a second detected beacon, to produce a second distance as a distance to the second detected beacon, the step of searching at the azimuth angle θaz and at the elevation angle θEL forming a second phase of detection; and locating the position of the beacon by the azimuth angle θaz and the second distance if the second distance is approximately equal to the first distance measurement.

* * * * *